(12) United States Patent
Jinbo

(10) Patent No.: US 10,788,129 B2
(45) Date of Patent: Sep. 29, 2020

(54) SEALING DEVICE

(71) Applicant: NOK CORPORATION, Minato-ku, Tokyo (JP)

(72) Inventor: Kazunori Jinbo, Kitaibaraki (JP)

(73) Assignee: NOK CORPORATION, Minato-Ku, Tokyo (JP)

( * ) Notice: Subject to any disclaimer, the term of this patent is extended or adjusted under 35 U.S.C. 154(b) by 46 days.

(21) Appl. No.: 16/037,624

(22) Filed: Jul. 17, 2018

(65) Prior Publication Data
US 2019/0032784 A1    Jan. 31, 2019

(30) Foreign Application Priority Data

Jul. 31, 2017 (JP) ................. 2017-147409

(51) Int. Cl.
| | |
|---|---|
| *F16J 15/3236* | (2016.01) |
| *F16J 15/3204* | (2016.01) |
| *F16C 17/02* | (2006.01) |
| *F16C 33/72* | (2006.01) |
| *F16J 15/16* | (2006.01) |

(52) U.S. Cl.
CPC ........... *F16J 15/3204* (2013.01); *F16C 17/02* (2013.01); *F16C 33/723* (2013.01); *F16J 15/3236* (2013.01); *F16J 15/164* (2013.01)

(58) Field of Classification Search
CPC .. F16J 15/3204; F16J 15/3232; F16J 15/3236; F16J 15/164
See application file for complete search history.

(56) References Cited

U.S. PATENT DOCUMENTS

| | | | | |
|---|---|---|---|---|
| 2,841,429 A | * | 7/1958 | McCuistion | ......... F16J 15/3236 277/402 |
| 3,831,950 A | * | 8/1974 | Bentley | ................ F16J 15/3236 277/649 |

(Continued)

FOREIGN PATENT DOCUMENTS

| | | | | |
|---|---|---|---|---|
| CA | 2968621 A1 | * | 6/2016 | ........... F16J 15/3236 |
| DE | 102014223162 A1 | * | 5/2016 | ........... F16J 15/3236 |

(Continued)

*Primary Examiner* — Gilbert Y Lee
(74) *Attorney, Agent, or Firm* — United IP Counsselors, LLC

(57) ABSTRACT

A sealing device that is applicable to high-speed rotation applications and has an increased pressure resistance is provided. The sealing device includes: a first side discharge valve located on a first side, on which a fluid is to be sealed, of an outer circumferential sealing surface, the first side discharge valve extending radially outward toward the first side for allowing a gas in a space between an inner circumferential surface of a housing and an outer circumferential sealing surface to be discharged toward the first side while blocking a gas from entering the space from the first side; and a second side discharge valve located on an atmosphere side that is opposite to the first side with respect to the outer circumferential sealing surface, the second side discharge valve extending radially outward toward the atmosphere side for allowing the gas in the space to be discharged toward the atmosphere side while blocking a gas from entering the space from the atmosphere side.

16 Claims, 11 Drawing Sheets

(56) References Cited

U.S. PATENT DOCUMENTS

| | | | |
|---|---|---|---|
| 2009/0014963 A1* | 1/2009 | Fietz | F16J 15/025 |
| | | | 277/402 |
| 2010/0052267 A1* | 3/2010 | Castleman | F16J 15/166 |
| | | | 277/551 |
| 2017/0261104 A1* | 9/2017 | Hockey | F16J 15/3236 |
| 2017/0261105 A1* | 9/2017 | Hockey | F16J 15/3236 |
| 2017/0261106 A1* | 9/2017 | Hockey | F16J 15/3236 |
| 2019/0309851 A1* | 10/2019 | Nitzken | F16J 15/0881 |

FOREIGN PATENT DOCUMENTS

| | | | | |
|---|---|---|---|---|
| DE | 102014225319 A1 * | 6/2016 | | F02M 59/442 |
| JP | 2003-322163 A | 11/2003 | | |
| JP | 6223633 B1 * | 11/2017 | | F16J 15/18 |
| WO | WO-2018037918 A1 * | 3/2018 | | F16J 15/18 |

* cited by examiner

SEALING DEVICE

CROSS-REFERENCE TO RELATED APPLICATIONS

This application claims the benefit of priority to Japanese Patent Application No. 2017-147409, filed on Jul. 31, 2017, the entire contents of which are hereby incorporated by reference.

BACKGROUND

1. Technical Field

The present invention relates to a sealing device made of a rubber-like elastic body for sealing an annular gap between a shaft and a housing, the shaft and the housing rotating relative to each other.

2. Description of the Background

A sealing device shown in FIG. 10, for example, is known as such a sealing device made of a rubber-like elastic body for sealing an annular gap between a shaft and a housing, the shaft and the housing rotating relative to each other. FIG. 10 is a schematic cross-sectional view of a sealing device according to a first conventional embodiment. The sealing device 500 integrally includes an annular body portion (waist portion) 510, an inner circumferential lip 520 extending radially inward from the body portion 510 toward a sealed-fluid side, and an outer circumferential sealing portion 530 having an outer circumferential sealing surface 550. The sealing device 500 also has an annular pressure receiving groove 540 connecting an outer circumferential surface of the inner circumferential lip 520 and an inner circumferential surface of the outer circumferential sealing portion 530. The sealing device 500 configured as described above maintains a sealing function even when rotated at high-speed rotation (for example, 1000 rpm). However, the sealing device 500 has a pressure resistance that is not so high because the sealed fluid leaks from the outer circumferential surface side of the sealing device 500 under a high-pressure condition (for example, 15 MPa).

In order to increase the pressure resistance, sealing devices common for reciprocating applications are often used for rotational applications. FIG. 11 is a schematic cross-sectional view of a sealing device according to a second conventional embodiment. The sealing device 600 integrally includes an annular body portion (waist portion) 610, an inner circumferential lip 620 extending from the body portion 610 radially inward toward a sealed-fluid side, and an outer circumferential lip 630 extending radially outward from the body portion 610 toward the sealed-fluid side. The sealing device 600 also has an annular pressure receiving groove 640 connecting an outer circumferential surface of the inner circumferential lip 620 and an inner circumferential surface of the outer circumferential lip 630. The sealing device 600 configured as described above maintains a sealing function even under a high-pressure condition as described above because the outer circumferential lip 630 improves the air tightness. However, in high-speed rotation applications as described above, the sealing device 600 rotates together with the rotational shaft, causing the outer circumferential lip 630 to wear over time. The sealing device 600 is thus not suitable for high-speed rotation applications.

[Patent Literature 1] Japanese Patent Application Laid-Open No. 2003-322163

BRIEF SUMMARY

It is an object of the present invention to provide a sealing device that is applicable to high-speed rotation applications and has an increased pressure resistance.

In order to solve the above problem, the present invention employs the following means.

One or more aspects of the present invention provides a sealing device made of a rubber-like elastic body for sealing an annular gap between a shaft and a housing, the shaft and the housing rotating relative to each other, the sealing device including:

an inner circumferential lip extending radially inward toward a first side;

an outer circumferential sealing portion having an outer circumferential sealing surface;

an annular pressure receiving groove connecting an outer circumferential surface of the inner circumferential lip and an inner circumferential surface of the outer circumferential sealing portion;

a first side discharge valve located on the first side, on which a fluid is to be sealed, of the outer circumferential sealing surface, the first side discharge valve extending radially outward toward the first side for allowing a gas in a space between an inner circumferential surface of the housing and the outer circumferential sealing surface to be discharged toward the first side while blocking a gas from entering the space from the first side; and a second side discharge valve located on a second side of the outer circumferential sealing surface, the second side being opposite to the first side with respect to the outer circumferential sealing surface, the second side discharge valve extending radially outward toward the second side for allowing a gas in the space to be discharged toward the second side while blocking a gas from entering the space from the second side.

A "first side" means a side on which a fluid is to be sealed. In other words, even in a state with no fluid currently sealed thereon, the side on which a fluid is to be sealed is called "first side."

According to the present embodiment, the gas in a space between the inner circumferential surface of the housing and the outer circumferential sealing surface is discharged through the first side discharge valve toward the first side. Additionally, the gas in the space between the inner circumferential surface of the housing and the outer circumferential sealing surface is discharged through the second side discharge valve toward the second side. Accordingly, a sealed space, which is formed by the inner circumferential surface of the housing, the outer circumferential sealing surface, the first side discharge valve, and the second side discharge valve, can have an air pressure lower than the pressures of fluids located outside the sealed space. As a result, the outer circumferential sealing surface is suctioned on the inner circumferential surface of the housing. This reduces the risk of the sealing device and the housing sliding relative to each other, making the sealing device applicable to high-speed rotation applications. Furthermore, the outer circumferential surface side of the sealing device is able to have a higher air tightness, increasing the pressure resistance.

Preferably, both an outer diameter of a distal end of the first side discharge valve and an outer diameter of a distal end of the second side discharge valve are larger than an outer diameter of the outer circumferential sealing surface.

As the outer diameter of the distal end of the first side discharge valve and the outer diameter of the distal end of the second side discharge valve become larger than the outer diameter of the outer circumferential sealing surface, the more gas is discharged from the sealed space. As the more gas is discharged, the air pressure in the sealed space becomes lower than the pressures of fluids located outside the sealed space.

Preferably, an annular groove is provided in the inner circumferential surface of the first side discharge valve. The annular groove receives a pressure of the fluid to be sealed.

This configuration causes the first side discharge valve to be pressed against the inner circumferential surface of the housing under a pressure of the sealed fluid in the annular groove.

Preferably, a first annular recess is provided between the first side discharge valve and the outer circumferential sealing surface and a second annular recess is provided between the second side discharge valve and the outer circumferential sealing surface.

With this configuration, the effect of deformation of the first side discharge valve on the circumferential sealing surface can be reduced and the effect of the deformation of the second side discharge valve on the outer circumferential sealing surface can also be reduced.

Note that the above-described configurations can be used in combination as many as possible.

As described above, a sealing device according to the present invention is applicable to high-speed rotation applications and has an increased pressure resistance.

DETAILED DESCRIPTION

Modes of carrying out the present invention are exemplarily described below in detail based on embodiments and with reference to the drawings. However, dimensions, materials, shapes, relative positions, and the like of components described in the embodiments are not intended to exclusively restrict the scope of the present invention unless otherwise specified.

First Embodiment

Figure 1:
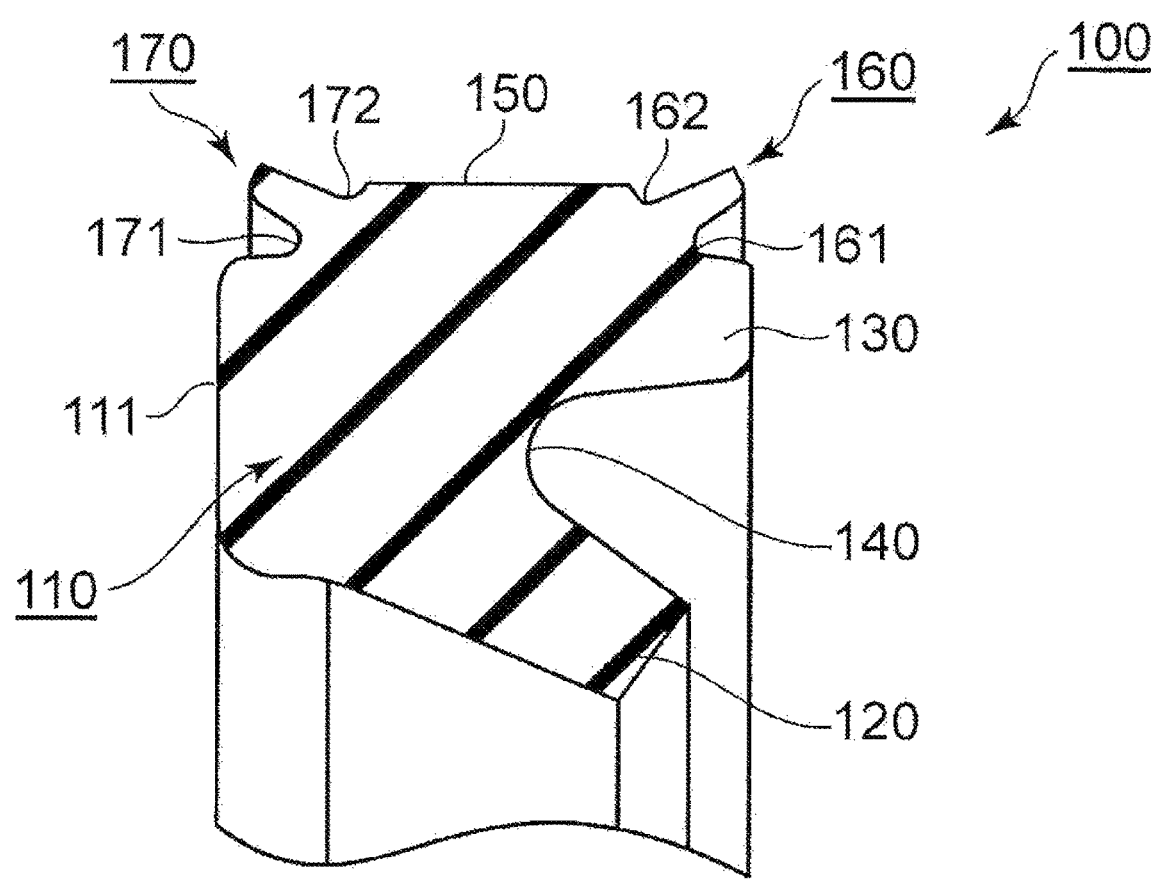
FIG. 1 is a schematic cross-sectional view of a sealing device according to a first embodiment.
Figure 2:
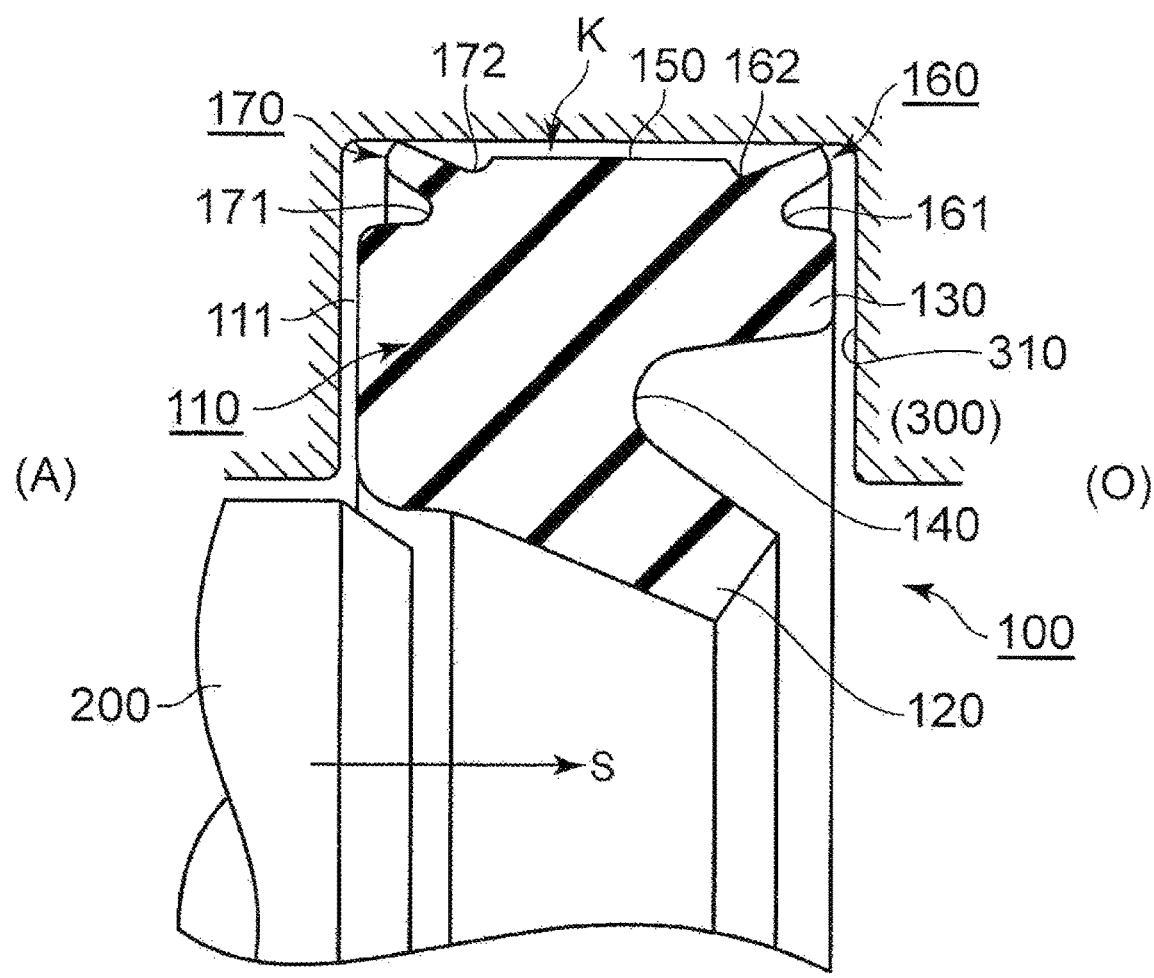
FIG. 2 is a schematic cross-sectional view of a sealing structure according to the first embodiment during assembly.
Figure 3:
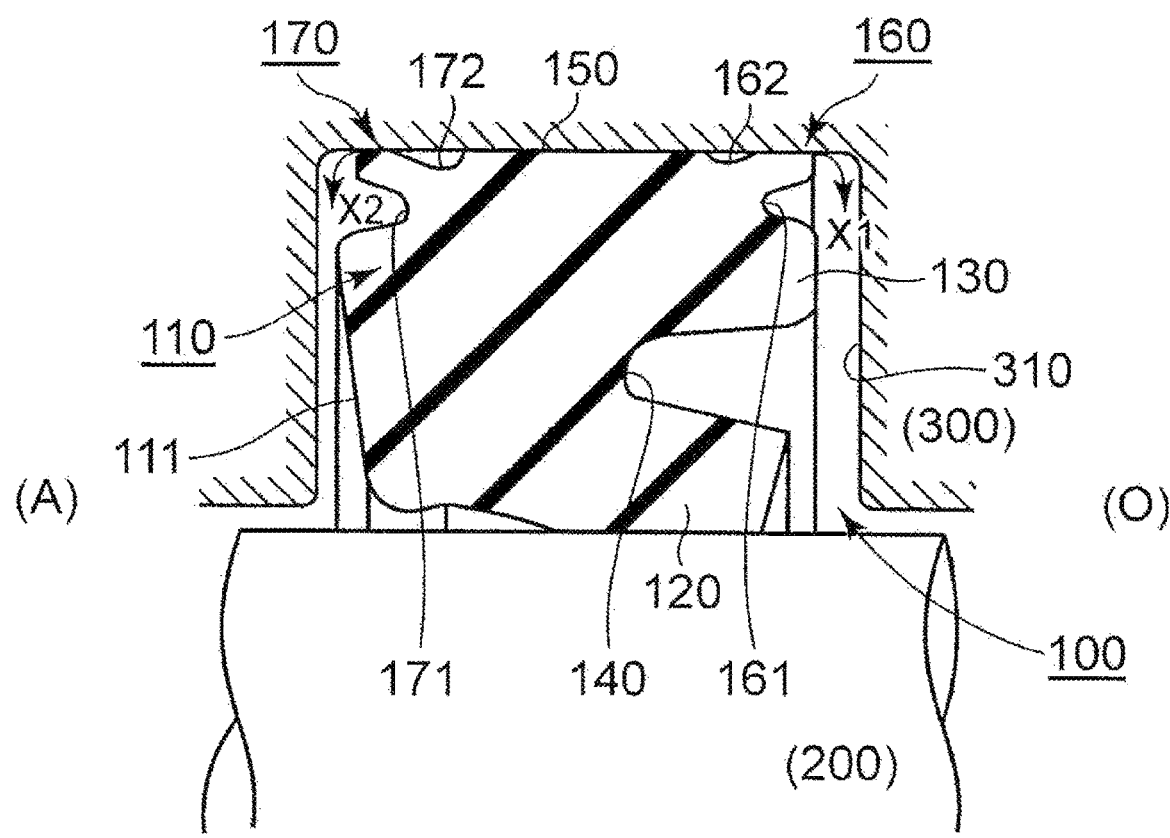
FIG. 3 is a schematic cross-sectional view of the sealing structure according to the first embodiment.
Figure 4:
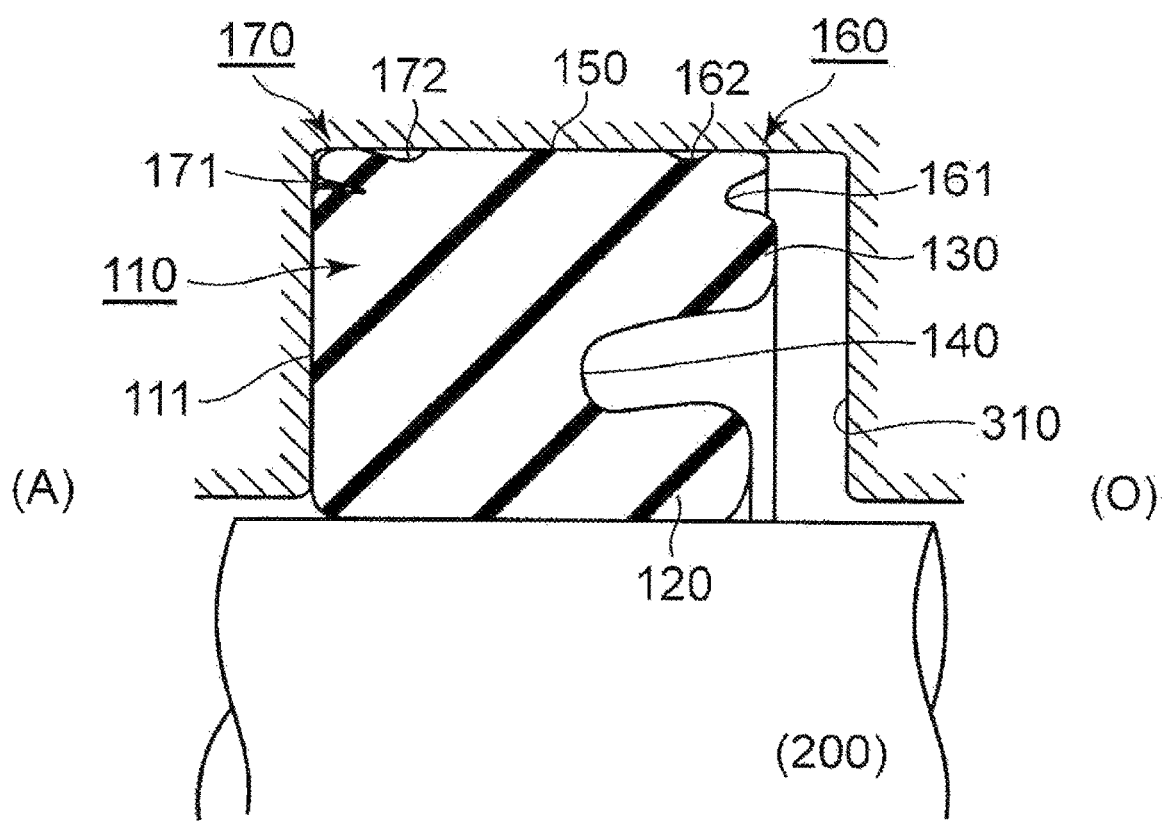
FIG. 4 is a schematic cross-sectional view of the sealing structure according to the first embodiment.

A sealing device according to a first embodiment is described with reference to FIGS. 1 to 4. FIG. 1 is a schematic cross-sectional view of a sealing device according to the first embodiment. FIG. 2 is a schematic cross-sectional view of a sealing structure according to the first embodiment during assembly. FIG. 3 is a schematic cross-sectional view of the sealing structure according to the first embodiment, with the sealing device assembled therein. FIG. 4 is a schematic cross-sectional view of the sealing structure according to the first embodiment in use. Note that the sealing device according to this embodiment has a rotationally symmetrical shape and FIGS. 1 to 4 each show a cross-sectional view of the sealing device taken along a plane including the central axis of the sealing device.

Sealing Structure

With reference to FIGS. 3 and 4, a sealing structure employing a sealing device according to the present embodiment is described. The sealing structure according to this embodiment includes a shaft 200, a housing 300 which rotates relative to the shaft 200, and a sealing device 100 for sealing an annular gap between the shaft 200 and the housing 300. An annular fitting groove 310 is provided in an inner circumferential surface of the housing 300. The sealing device 100 is fit to the fitting groove 310. Note that the right side in FIG. 4 is a first side (O) on which a fluid (e.g., oil) is to be sealed and the left side is an atmosphere side (A). The atmosphere side (A) corresponds to a second side that is opposite to the first side (O). As described above, the first side (O) means a side on which a fluid is to be sealed. In other words, even in a state with no fluid currently sealed thereon, the side on which a fluid is to be sealed is the first side (O).

Sealing Device

The sealing device 100 according to this embodiment is made of a rubber-like elastic body. For the rubber-like elastic body, any common rubber materials can be used. Preferable examples thereof include NBR, ACM, H-NBR, FKM, EPDM, and urethane. The sealing device 100 includes an annular body portion (waist portion) 110, an inner circumferential lip 120 extending radially inward toward the first side (O), and an outer circumferential sealing portion 130 having an outer circumferential sealing surface 150. The sealing device 100 also has an annular pressure receiving groove 140 provided so as to connect the outer circumferential surface of the inner circumferential lip 120 and the inner circumferential surface of the outer circumferential sealing portion 130. The inner circumferential lip 120 is configured to slidably and directly contact the outer circumferential surface of the shaft 200. Note that in this embodiment, an end surface 111 on the atmosphere side (A) of the body portion 110 is a surface perpendicular to the central axis of the sealing device 100. In addition, the outer circumferential sealing surface 150 is a cylindrical surface.

The sealing device 100 according to this embodiment has a first side discharge valve 160 provided on the first side (O) of the outer circumferential sealing surface 150. The first side discharge valve 160 is configured to extend radially outward toward the first side (O). The first side discharge valve 160 thus allows a gas in a space K between the inner circumferential surface of the housing 300 (corresponding to the groove bottom of the fitting groove 310) and the outer circumferential sealing surface 150 to be discharged toward the first side (O), while achieving a function of blocking a gas from entering the space K from the first side (O).

In a state where no external force acts on the sealing device 100, the outer diameter of the distal end of the first side discharge valve 160 is designed to be larger than the outer diameter of the outer circumferential sealing surface 150 and the outer diameter of the inner circumferential surface (i.e., the groove bottom of the fitting groove 310) of the housing 300.

The first side discharge valve 160 is designed in thickness and length to have such a rigidity that the outer circumferential sealing surface 150 directly contacts the inner circumferential surface of the housing 300 in a state where the sealing device 100 is assembled (i.e., a state where the sealing device 100 has been fit to the fitting groove 310 and the shaft 200 has been assembled). Additionally, the distal end of the first side discharge valve 160 is desirably designed so as not to project toward the first side (O) beyond an end face on the first side (O) of a main body portion (a portion except for the first side discharge valve 160) of the outer circumferential sealing portion 130 when the sealing device 100 is assembled. This reduces the possibility that the first side discharge valve 160 contacts a groove side surface of the fitting groove 310 (a side surface on the first side (O)). Therefore, the gas discharge function of the first side discharge valve 160 is less likely to be impaired. Additionally, a decrease in the directly contacting force of the circumferential sealing surface 150 against the groove bottom of the fitting groove 310 may be limited.

Furthermore, an annular groove 161 is provided in the inner circumferential surface of the first side discharge valve 160. The annular groove 161 receives the pressure of the sealed fluid. Moreover, an annular recess 162 is provided between the first side discharge valve 160 and the outer circumferential sealing surface 150.

Additionally, the sealing device 100 according to this embodiment includes a second side discharge valve 170 on the second side (the atmosphere side (A)), which is opposite to the first side, of the outer circumferential sealing surface 150. The second side discharge valve 170 is configured to extend radially outward toward the atmosphere side (A). The second side discharge valve 170 thus allows the gas in the space K to be discharged toward the atmosphere side (A), while achieving a function of blocking a gas from entering the space K from the atmosphere side (A).

The outer diameter of the distal end of the second side discharge valve 170 is designed to be larger than the outer diameter of the outer circumferential sealing surface 150 and the outer diameter of the inner circumferential surface (i.e., the groove bottom of the fitting groove 310) of the housing 300 in a state with no external force acting on the sealing device 100.

The second side discharge valve 170 are designed in thickness and length to have such a rigidity that the outer circumferential sealing surface 150 directly contacts the inner circumferential surface of the housing 300 when the sealing device 100 is assembled. Additionally, the distal end of the second side discharge valve 170 is desirably designed so as not to project toward the atmosphere side (A) beyond an end face on the atmosphere side (A) of the main body portion (a portion except for the second side discharge valve 170) of the outer circumferential sealing portion 130 when the sealing device 100 is assembled. This reduces the possibility that the second side discharge valve 170 contacts a groove side surface of the fitting groove 310 (a side surface on the atmosphere side (A)). Therefore, the gas discharge function of the second side discharge valve 170 is less likely to be impaired. Additionally, a decrease in the directly contacting force of the circumferential sealing surface 150 against the groove bottom of the fitting groove 310 may be limited. Furthermore, even in a case where the fluid pressure acts from the first side (O), the second side discharge valve 170 is less likely to be strongly pressed against the groove side surface of the fitting groove 310. Thus, the second side discharge valve 170 is less prone to be damaged.

Furthermore, an annular groove 171 is provided in the inner circumferential surface of the second side discharge valve 170. Note that in a state with the pressure exerted by the sealed fluid acting on the sealing device 100, the second side discharge valve 170 is pressed against the groove side surface of the fitting groove 310; thus, the annular groove 171 is desirably designed in size so that the second side discharge valve 170 does not excessively deform. An annular recess 172 is provided between the second side discharge valve 170 and the outer circumferential sealing surface 150.

Mechanism of Sealing Device According to the Embodiment

In assembling the sealing device 100, the sealing device 100 is first fit into the fitting groove 310 of the housing 300. As described above, the outer diameter of the distal end of the first side discharge valve 160 and the outer diameter of the distal end of the second side discharge valve 170 are larger than the outer diameter of the outer circumferential sealing surface 150 and also the outer diameter of the groove bottom of the fitting groove 310. Therefore, when the sealing device 100 is fit into the fitting groove 310, the distal end of the first side discharge valve 160 and the distal end of the second side discharge valve 170 directly contact the groove bottom of the fitting groove 310, slightly deforming the distal ends. Here, the direct contact of the distal end of the first side discharge valve 160 and the distal end of the second side discharge valve 170 against the groove bottom of the fitting groove 310 forms an sealed space K between the groove bottom of the fitting groove 310, the outer circumferential sealing surface 150, the first side discharge valve 160, and the second side discharge valve 170. The slightly deforming process of the distal end of the first side discharge valve 160 and the distal end of the second side discharge valve 170 slightly decreases the volume of the space K. Note that in a state where the sealing device 100 is fit to the fitting groove 310 but the shaft 200 is not assembled yet, either design is possible: in which a small gap exists between the circumferential sealing surface 150 and the groove bottom of the fitting groove 310, or in which the circumferential sealing surface 150 may directly contact the groove bottom of the fitting groove 310. However, air may be more reliably discharged from the space K to the outside with the latter design in which the outer circumferential sealing surface 150 and the groove bottom of the fitting groove 310 directly contact before the shaft 200 is assembled. Additionally, oil may adhere to the outer circumferential surface of the sealing device 100 or the inner circumferential surface of the housing 300. Any oil film formed between the sealing device 100 and the housing 300 may cause them to slide relative to each other. Therefore, the oil between the sealing device 100 and the housing 300 is desirably discharged to the outside of the space K in the process of assembly of the sealing structure. Thus, for the purpose of facilitating the discharge of the oil to the outside of the space K also, the outer circumferential sealing surface 150 and the groove bottom of the fitting groove 310 preferably directly contact each other before the shaft 200 is assembled.

As described above, the volume of the sealed space K decreases in the process of fitting the sealing device 100 to the fitting groove 310. As a result, the gas in the space K is partly discharged to the outside of the space K through the first side discharge valve 160 and the second side discharge valve 170. Therefore, an air pressure in the space K becomes lower than an air pressure (in this case, the atmospheric pressure) outside the space K.

After the sealing device 100 is fit into the fitting groove 310, the shaft 200 is assembled. In this embodiment, the shaft 200 is inserted from the atmosphere side (A) to the first side (O) (see the arrow S in FIG. 2). The assembling of the shaft 200 causes the sealing device 100 to be pressed radially outward. As a result, the volume of the space K further decreases. Note that, even with the configuration where a gap is formed between the outer circumferential sealing surface 150 and the groove bottom of the fitting groove 310 before the shaft 200 is assembled, the outer circumferential sealing surface 150 directly contacts the groove bottom of the fitting groove 310 when the shaft 200 is assembled.

As described above, in the process of assembling the shaft 200, a part of the gas in the space K is further discharged to the outside of the space K through the first side discharge valve 160 and the second side discharge valve 170. Therefore, the air pressure in the space K becomes further lower than an air pressure (in this case, the atmospheric pressure) outside the space K. Note that the gas in the space K is discharged through the first side discharge valve 160 toward the first side (O) (see the arrow X1 in FIG. 3), while the gas in the space K is discharged through the second side discharge valve 170 toward the atmosphere side (A) (see the arrow X2 in FIG. 3).

In a state where a target fluid is sealed on the first side (O) after the sealing device 100 has been assembled, the sealing device 100 is pressed from the first side (O) to the atmosphere side (A) and the pressure receiving groove 140 and the annular groove 161 receive the pressure of the sealed fluid. The sealing device 100 then moves to the atmospheric side (A), so that the end surface 111 of the body portion 110 directly contacts the groove side surface of the fitting groove 310. Furthermore, both the radially outer surface of the pressure receiving groove 140 and the radially outer surface of the annular groove 161 are pressed radially outward, so that the volume of the space K (particularly, volumes in the annular recess 162 and the annular recess 172) further decreases. As a result, the gas in the space K is further partly discharged to the outside of the space K through the first side discharge valve 160 and the second side discharge valve 170. Accordingly, an air pressure in the space K becomes lower than the pressures of the fluids located outside the space K (a pressure of the sealed fluid on the first side (O), and the atmospheric pressure on the atmosphere side (A)). In this embodiment, the air pressure in the space K is desirably designed to be eventually close to vacuum.

As described above, the air pressure in the sealed space K decreases in three steps: the step of fitting the sealing device 100 to the fitting groove 310, the step of assembling the shaft 200, and the step of sealing a target fluid on the first side (O). Accordingly, the air pressure in the space K becomes lower than the pressures of the fluids located outside the space K. Therefore, the outer circumferential surface (a portion from the distal end of the first side discharge valve 160 to the distal end of the second side discharge valve 170 in the axial direction) of the outer circumferential sealing portion 130 in the sealing device 100 is suctioned on the inner circumferential surface of the housing 300 (the groove bottom of the fitting groove 310). This suction principle is the same as that for suction cups.

Advantages of Sealing Device According to the Embodiment

The sealing device 100 according to this embodiment includes the first side discharge valve 160 and the second side discharge valve 170, which allows the outer circumferential surface of the sealing device 100 to be suctioned on the inner circumferential surface of the housing 300. This reduces the risk of the sealing device 100 and the housing 300 sliding relative to each other, so that the sealing device 100 is applicable to high-speed rotation applications. Furthermore, an improved air tightness on the outer circumferential surface side of the sealing device 100 may also improve the pressure resistance.

Note that both the outer diameter of the distal end of the first side discharge valve 160 and the outer diameter of the distal end of the second side discharge valve 170 are larger than the outer diameter of the outer circumferential sealing surface 150. Here, as the outer diameter of the distal end of the first side discharge valve 160 and the outer diameter of the distal end of the second side discharge valve 170 become larger than the outer diameter of the outer circumferential sealing surface 150, a larger volume of gas may be discharged from the sealed space K. As the more gas is discharged, the air pressure in the space K may become lower than the pressures of fluid located outside the space K.

Moreover, the sealing device 100 according to this embodiment has an annular groove 161 provided in the inner circumferential surface of the first side discharge valve 160 to receive the pressure of the sealed fluid. This causes the first side discharge valve 160 to be pressed against the inner circumferential surface of the housing 300 under a pressure of the sealed fluid in the annular groove 161. Therefore, the air tightness on the outer circumferential surface side of the sealing device 100 may be more reliably improved.

Furthermore, in the sealing device 100 according to this embodiment, the annular recess 162 is provided between the first side discharge valve 160 and the outer circumferential sealing surface 150. Furthermore, the annular recess 172 is provided between the second side discharge valve 170 and the outer circumferential sealing surface 150. Therefore, the effect of deformation of the first side discharge valve 160 on the circumferential sealing surface 150 may be reduced and the effect of the deformation of the second side discharge valve 170 on the outer circumferential sealing surface 150 may also be reduced.

Second Embodiment

Figure 5:
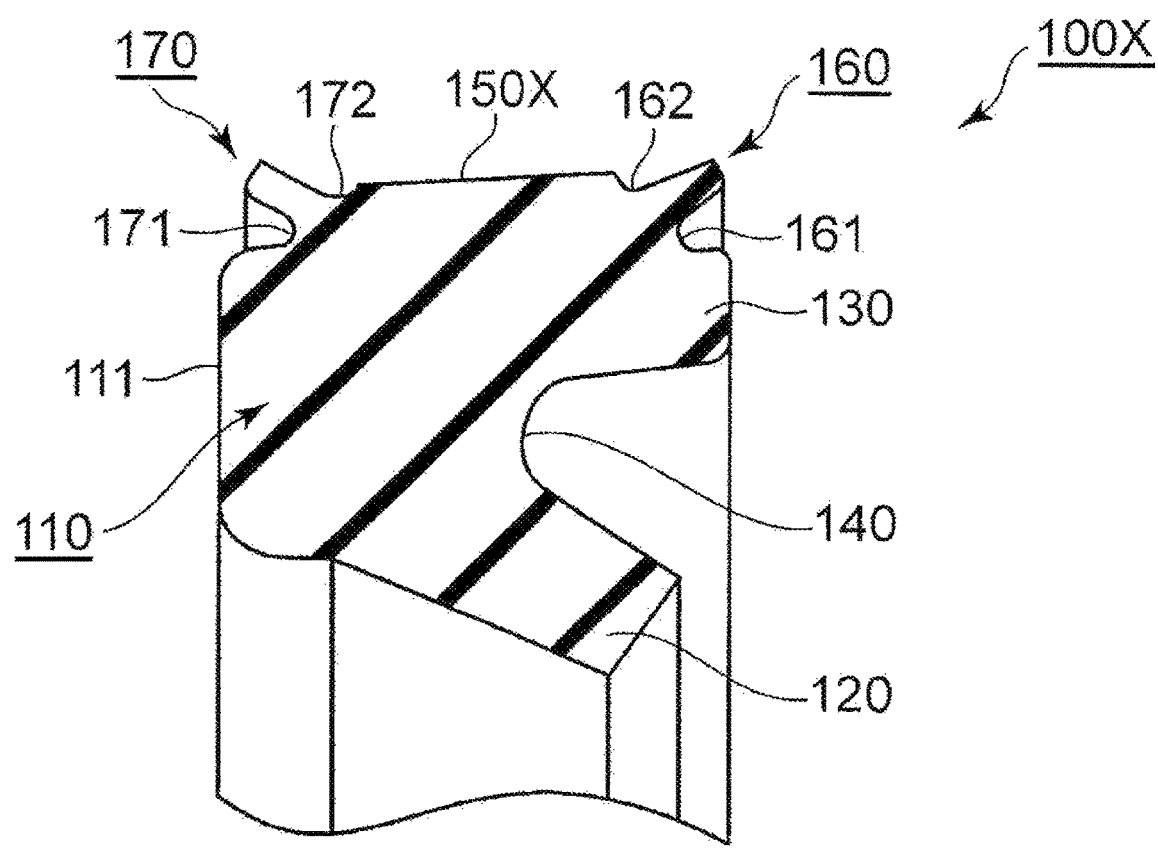
FIG. 5 is a schematic cross-sectional view of a sealing device according to a second embodiment.
Figure 6:
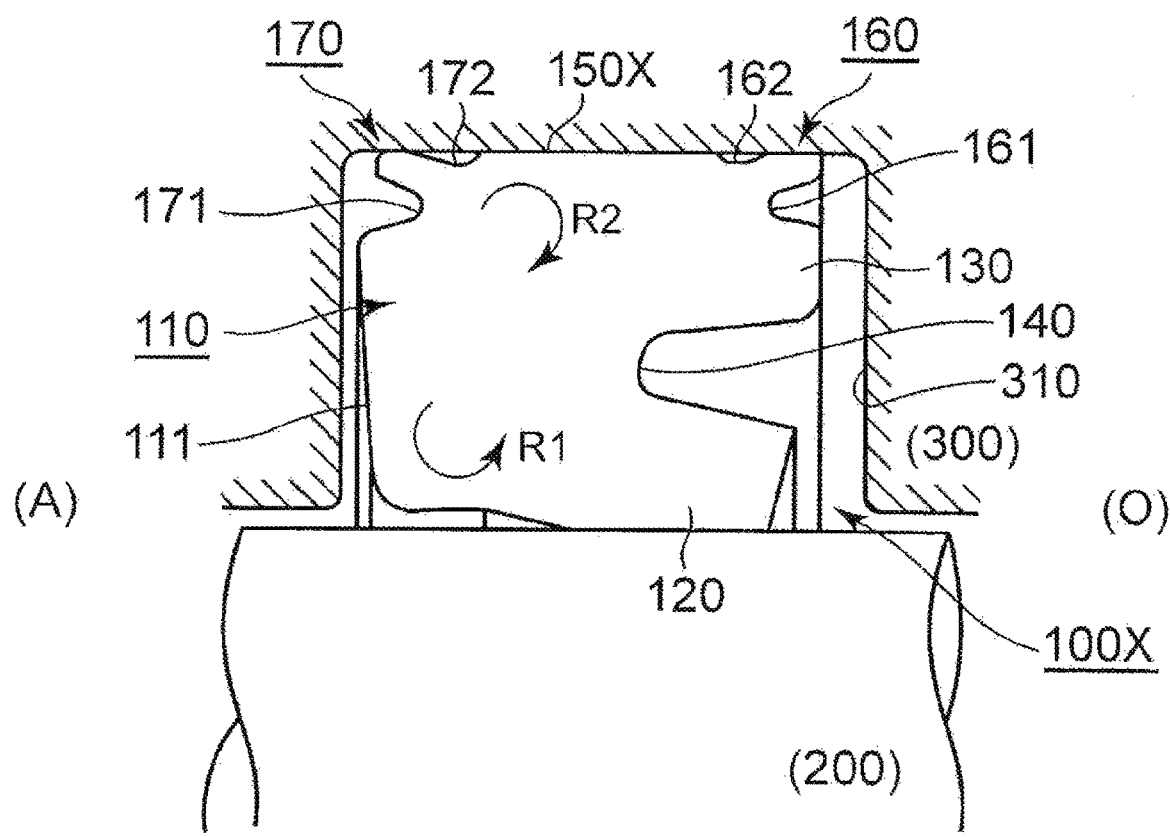
FIG. 6 is a schematic cross-sectional view of a sealing structure according to the second embodiment.

FIGS. 5 and 6 show a second embodiment. In the above first embodiment, the outer circumferential sealing surface is a cylindrical surface. In contrast, in this embodiment, the outer circumferential sealing surface is tapered. Other configurations and operations of the second embodiment are the same as those of the first embodiment. The same components are denoted by the same reference numerals and description thereof is omitted.

FIG. 5 is a schematic cross-sectional view of a sealing device according to the second embodiment. FIG. 6 is a schematic cross-sectional view of a sealing structure according to the second embodiment, with the sealing device assembled therein. Note that the sealing device according to this embodiment has a rotationally symmetrical shape and FIGS. 5 and 6 each show a cross-sectional view of the sealing device taken along a plane including the central axis of the sealing device.

The sealing device 100X according to this embodiment differs from the sealing device 100 in the first embodiment only in that an outer circumferential sealing surface 150X is tapered. The outer circumferential sealing surface 150X according to this embodiment is tapered to have a diameter decreasing from the first side (O) toward the second side (A).

Hereinafter, technical meaning of tapering the outer circumferential sealing surface 150X is described. When the inner circumferential lip 120 is pressed radially outward by the shaft 200, a moment in the arrow R1 direction in FIG. 6 acts on the body portion 110 in the sealing device 100X. The end surface 111 of the body portion 110 thus becomes farther away from the groove side surface of the fitting groove 310 toward the radially inner side. In contrast, in a case where the outer circumferential sealing surface 150X is tapered, a moment in the arrow R2 direction in FIG. 6 acts on the outer circumferential sealing portion 130 when the outer circumferential sealing surface 150X directly contacts the groove bottom of the fitting groove 310. This leads to a reduction in the moment in the arrow R1 direction. Therefore, in a state where the sealing device 100X has been assembled, the inclination of the end surface 111 of the body portion 110 may become lower than that in the case of the sealing device 100 according to the first embodiment. Accordingly, the posture of the sealing device 100X with respect to the fitting groove 310 may be stabilized. It goes without saying that also the sealing device 100X according to this embodiment is capable of achieving the same effects as in the case of the first embodiment.

Third Embodiment

Figure 7:
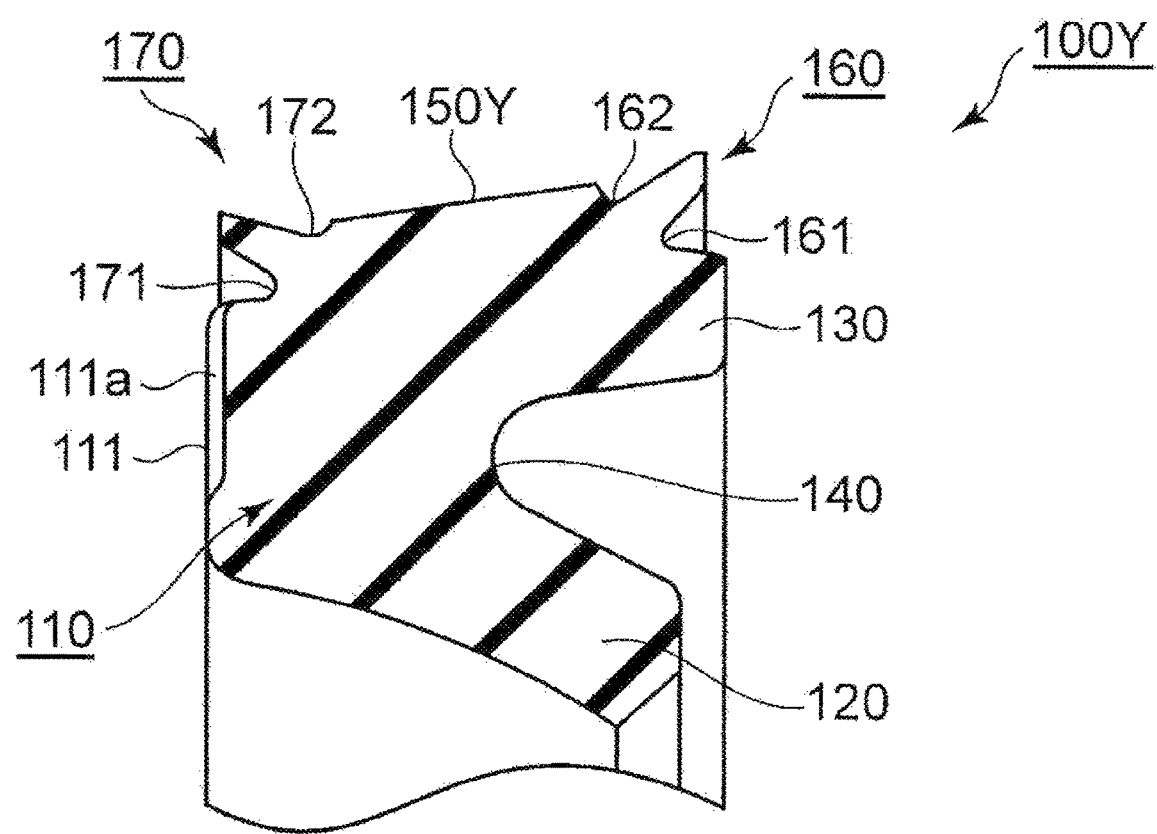
FIG. 7 is a schematic cross-sectional view of a sealing structure according to a third embodiment.
Figure 8:
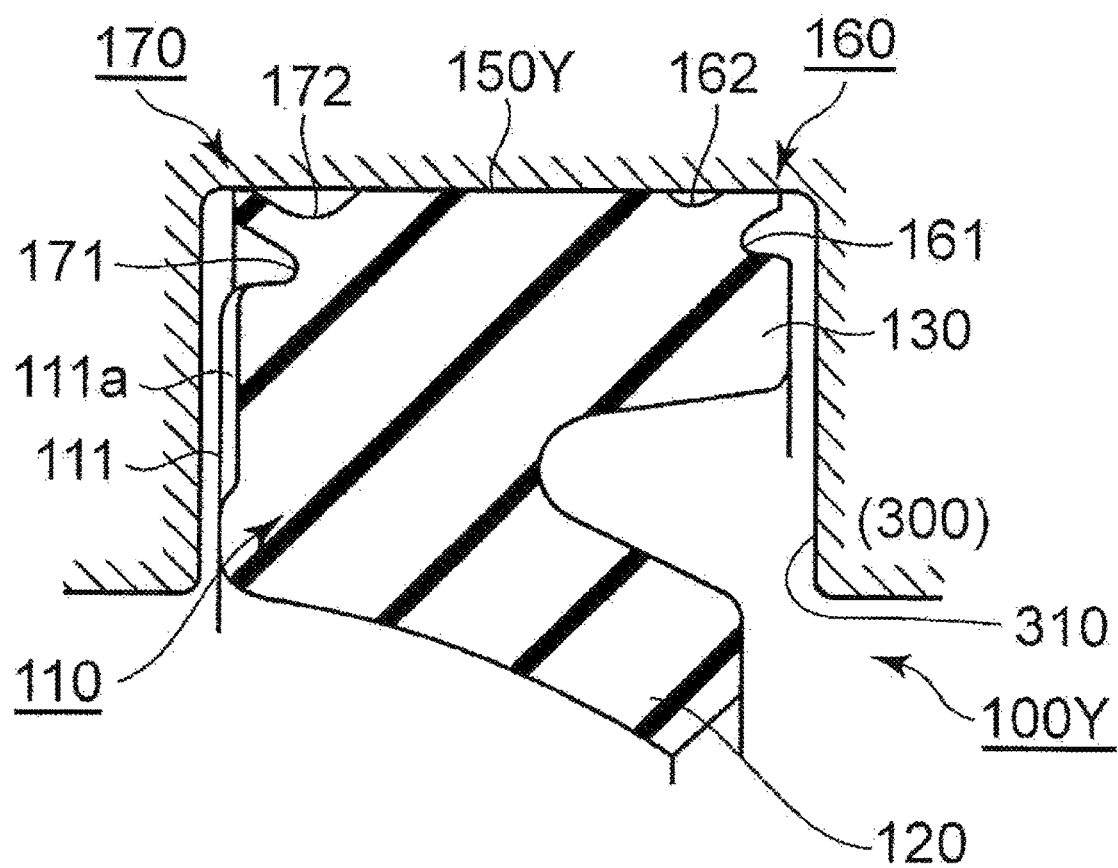
FIG. 8 is a schematic cross-sectional view of a sealing structure according to the third embodiment during assembly.

FIGS. 7 and 8 show a third embodiment. In this embodiment, the outer circumferential sealing surface is tapered as in the second embodiment; however, the taper angle of the tapered surface is larger than that in the second embodiment. Other basic configurations and operations of the third embodiment are the same as those in the first embodiment. The same components are denoted by the same reference numerals and description thereof is omitted.

FIG. 7 is a schematic cross-sectional view of a sealing device according to the third embodiment. FIG. 8 is a schematic cross-sectional view of the sealing structure according to the third embodiment during assembly and before the shaft is assembled. Note that the sealing device according to this embodiment has a rotationally symmetrical shape and FIGS. 7 and 8 each show a cross-sectional view of the sealing device taken along a plane including the central axis of the sealing device.

The sealing device 100Y according to the present embodiment has a tapered outer circumferential sealing surface 150Y, as in the second embodiment. The taper angle of the tapered surface is configured to be larger than that in the second embodiment. In the first and second embodiments described above, the outer diameter of the distal end of the second side discharge valve 170 is designed to be larger than the outer diameter of the outer circumferential sealing surface 150 and the outer diameter of the inner circumferential surface (i.e., the groove bottom of the fitting groove 310) of the housing 300 in a state with no external force acting on the sealing device 100 or 100X. In contrast, in this embodiment, the outer diameter of the distal end of the second side discharge valve 170 is larger than a smaller outer diameter of a part of the outer circumferential sealing surface 150, but smaller than a larger outer diameter of a part of the outer circumferential sealing surface 150. However, the third embodiment is the same as the first and second embodiments described above in that the outer diameter of the distal end of the second side discharge valve 170 is designed to be larger than the outer diameter of the inner circumferential surface of the housing 300 in a state with no external force acting on the sealing device 100Y. Additionally, the sealing device 100Y according to this embodiment has a groove 111a provided in the end surface 111 on the atmosphere side (A) in the body portion 110, the groove 111a extending radially inward from the radially outer end. The groove 111a may be provided alone, or a plurality of the grooves 111a may be provided at intervals along the circumferential direction. Configurations of the third embodiment other than the configurations for the outer circumferential sealing surface 150Y and the groove 111a are the same as those of the first and second embodiments and the description thereof is thus omitted.

The sealing device 100Y according to this embodiment configured as described above is also capable of achieving the same effects as in the first and second embodiments. Additionally, in the sealing device 100Y according to this embodiment, the outer circumferential sealing surface 150Y is tapered to have a large taper angle. Therefore, in the process of fitting the sealing device 100Y to the fitting groove 310, an area of the sealing device 100Y that directly contact the inner circumferential surface of the housing 300 spreads from a part having a larger outer diameter in the outer circumferential sealing surface 150Y to a part having a smaller outer diameter. This achieves a function of positively discharging air or oil between the sealing device 100Y and the housing 300 toward the second side discharge valve 170. Additionally, the groove 111a is provided in the end surface 111 on the atmosphere side (A) in the body portion 110. This ensures the function of discharging air and oil toward the second side discharge valve 170, even when the end surface 111 directly contact the groove side surface of the fitting groove 310.

Others

As described above, the outer circumferential surface of the sealing devices 100, 100X, and 100Y according to the embodiments may be suctioned on the inner circumferential surface of the housing 300. However, as described above, oil may remain in a space between the sealing device 100, 100X, or 100Y and the inner circumferential surface of the housing 300, or a small volume of oil may enter into the space during use. As a result, the suction force is reduced if any oil film is formed between the outer circumferential surface of the sealing device 100, 100X, or 100Y and the inner circumferential surface of the housing 300.

Figure 9:
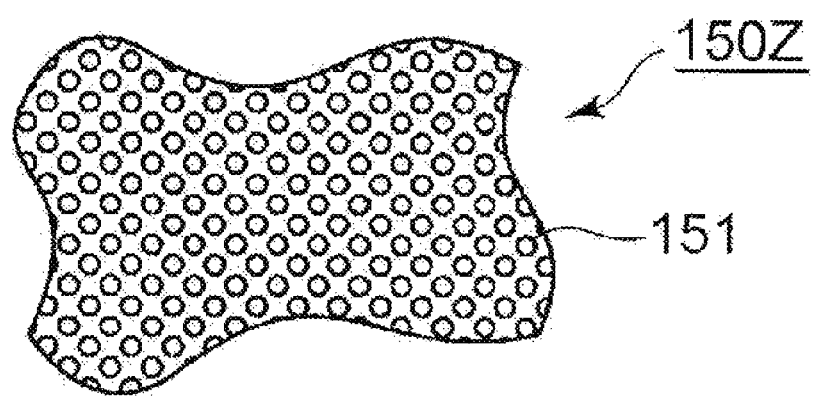
FIG. 9 is a partial external view of an outer circumferential sealing surface according to a modification.
Figure 10:
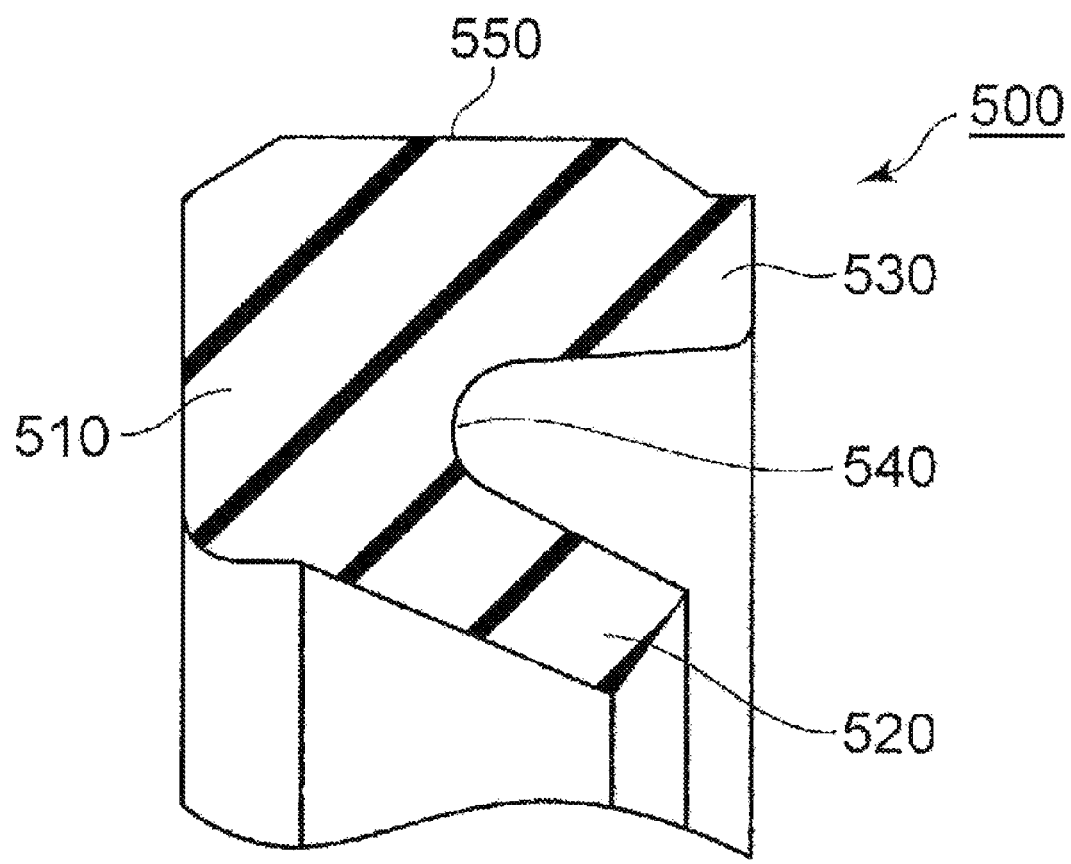
FIG. 10 is a schematic cross-sectional view of a sealing device according to a first conventional embodiment.
Figure 11:
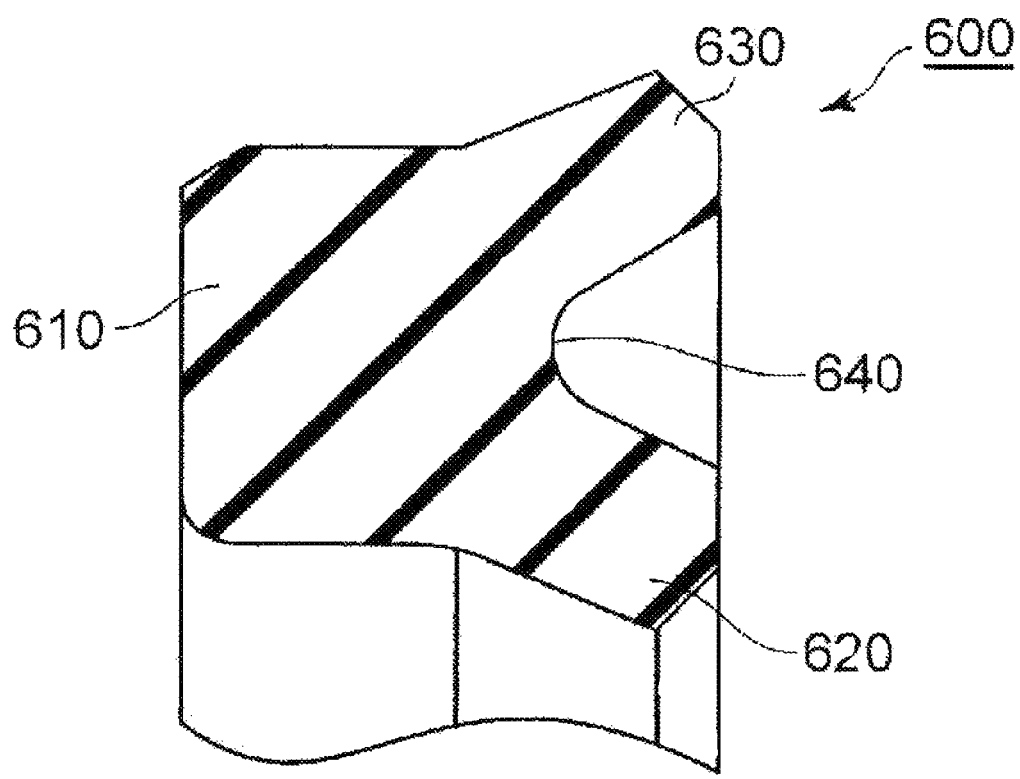
FIG. 11 is a schematic cross-sectional view of a sealing device according to a second conventional embodiment.

To address this problem, a plurality of minute recesses 151 is preferably provided in the surface of an outer circumferential sealing surface 150Z, as shown in FIG. 9. Providing the plurality of minute recesses 151 in this way reduces formation of an oil film, because oil is captured in the recesses 151. It goes without saying that the plurality of recesses 151 may be formed in the outer circumferential sealing surface 150 in the first embodiment, the outer circumferential sealing surface 150X in the second embodiment, and the outer circumferential sealing surface 150Y in the third embodiment.

REFERENCE SIGNS LIST 100, 100 X, 100 Y sealing device
110 body portion
111 end face
111a groove
120 inner circumferential lip
130 outer circumferential sealing portion
140 pressure receiving groove
150, 150X, 150Y, 150Z outer circumferential sealing surface
151 recess
160 first side discharge valve
161 annular groove
162 annular recess
170 second side discharge valve 171 annular groove
172 annular recess
200 shaft
300 housing
310 fitting groove
K space

What is claimed is:

1. A sealing device made of a rubber-like elastic body for sealing an annular gap between a shaft and a housing, the shaft and the housing rotating relative to each other, the sealing device comprising:
   an inner circumferential lip extending radially inward toward a first side;
   an end surface located on a second side opposite to the first side, the end surface perpendicular to a central axis of the sealing device;
   an outer circumferential sealing portion having an outer circumferential sealing surface, the outer circumferential sealing portion including
      a first side discharge valve located on the first side, the first side discharge valve extending radially outward toward the first side, and
      a second side discharge valve located on the second side, the second side discharge valve extending radially outward toward the second side; and
   an annular pressure receiving groove located between the first side of the inner circumferential lip and the first side of the outer circumferential sealing portion.

2. The sealing device according to claim 1, wherein the first side discharge valve allows a gas in a space between an inner circumferential surface of the housing and the outer circumferential sealing surface to be discharged toward the first side while blocking a gas from entering the space from the first side.

3. The sealing device according to claim 2, wherein the second side discharge valve allows the gas in a space between an inner circumferential surface of the housing and the outer circumferential sealing surface to be discharged toward the second side while blocking a gas from entering the space from the second side.

4. The sealing device according to claim 1, wherein the second side discharge valve allows the gas in a space between an inner circumferential surface of the housing and the outer circumferential sealing surface to be discharged toward the second side while blocking a gas from entering the space from the second side.

5. The sealing device according to claim 1, wherein an outer diameter of a distal end of the first side discharge valve is larger than an outer diameter of the outer circumferential sealing surface.

6. The sealing device according to claim 5, wherein an outer diameter of a distal end of the second side discharge valve is larger than the outer diameter of the outer circumferential sealing surface.

7. The sealing device according to claim 1, wherein the outer circumferential sealing portion has an annular groove located in an inner circumferential surface of the first side discharge valve, the annular groove receiving a pressure of the sealed fluid.

8. The sealing device according to claim 7, wherein the outer circumferential sealing portion has a first annular recess between the first side discharge valve and the outer circumferential sealing surface.

9. The sealing device according to claim 8, wherein the outer circumferential sealing portion has a second annular recess between the second side discharge valve and the outer circumferential sealing surface.

10. The sealing device according to claim 7, wherein the outer circumferential sealing portion has a second annular recess between the second side discharge valve and the outer circumferential sealing surface.

11. The sealing device according to claim 1, wherein the outer circumferential sealing portion has a first annular recess between the first side discharge valve and the outer circumferential sealing surface.

12. The sealing device according to claim 1, wherein the outer circumferential sealing portion has a second annular recess between the second side discharge valve and the outer circumferential sealing surface.

13. The sealing device according to claim 1, wherein the outer circumferential sealing surface is a cylindrical surface.

14. The sealing device according to claim 1, wherein the outer circumferential sealing surface is a tapered surface.

15. The sealing device according to claim 14, wherein the outer circumferential sealing surface has a diameter on the first side larger than a diameter on the second side.

16. The sealing device according to claim 1, wherein the outer circumferential sealing surface has a plurality of minute recesses.

* * * * *